US008447814B2

(12) United States Patent
Solyanik et al.

(10) Patent No.: US 8,447,814 B2
(45) Date of Patent: May 21, 2013

(54) REMOTE CONTROL USING INSTANT MESSAGING

(75) Inventors: Sergey Solyanik, Seattle, WA (US); Lee Linden, Bellevue, WA (US); Charles Kindel, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 11/635,190

(22) Filed: Dec. 7, 2006

(65) Prior Publication Data
US 2008/0140796 A1 Jun. 12, 2008

(51) Int. Cl.
*G06F 15/173* (2006.01)

(52) U.S. Cl.
USPC .......................................................... 709/206

(58) Field of Classification Search
USPC .................................. 709/206, 204, 217, 227
See application file for complete search history.

(56) References Cited

U.S. PATENT DOCUMENTS

| 5,734,831 | A | 3/1998 | Sanders |
| 6,115,743 | A | 9/2000 | Cowan et al. |
| 6,247,052 | B1 | 6/2001 | Huang et al. |
| 6,539,421 | B1 | 3/2003 | Appelman et al. |
| 6,615,255 | B1 | 9/2003 | Blaszczak |
| 6,643,694 | B1 | 11/2003 | Chernin |
| 6,789,112 | B1 | 9/2004 | Freeman et al. |
| 7,082,464 | B2 | 7/2006 | Hasan et al. |
| 7,103,656 | B2 | 9/2006 | Lewis et al. |
| 7,269,655 | B2 * | 9/2007 | Kim ............................... 709/228 |
| 7,283,620 | B2 * | 10/2007 | Adamczyk ................. 379/88.13 |
| 7,310,344 | B1 * | 12/2007 | Sue ................................ 370/410 |
| 7,356,567 | B2 * | 4/2008 | Odell et al. ................... 709/206 |
| 7,363,295 | B2 * | 4/2008 | Szeto et al. ....................... 707/3 |
| 7,403,838 | B2 * | 7/2008 | Deen et al. .................... 700/276 |
| 7,406,501 | B2 * | 7/2008 | Szeto et al. ................... 709/206 |
| 7,451,186 | B2 * | 11/2008 | Morinigo et al. .............. 709/206 |
| 7,519,073 | B2 * | 4/2009 | Caspi et al. ................... 370/410 |
| 7,529,796 | B2 * | 5/2009 | Riddle ........................... 709/204 |
| 2003/0014477 | A1 | 1/2003 | Oppenheimer et al. |
| 2003/0018725 | A1 | 1/2003 | Turner et al. |

FOREIGN PATENT DOCUMENTS

| EP | 1696620 A1 | 8/2006 |
| WO | 03036498 A1 | 5/2003 |

OTHER PUBLICATIONS

Law, et. al., "Smart Instant Messenger in Pervasive Computing Environments", http://www.cs.hku.hk/~clwang/papers/GPC2006-SIM-Camera.pdf.
Smith Warren "A Framework for Control and Observation in Distributed Environments", Date: Jun. 2001, http://people.nas.nasa.gov/~wwsmith/papers/CODE-tr.pdf.

(Continued)

*Primary Examiner* — David Eng
(74) *Attorney, Agent, or Firm* — Michael B Dodd; Dodd Law Group

(57) ABSTRACT

An instant messaging client may operate on a device and enable various forms of control of the device via instant messaging commands. The instant messaging client may connect to an instant messaging service using a user name and having a list of authorized users. The client may be able to sense that a user is on line and initiate a message session with the user. The user may also be able to initiate a session with the device through the instant messaging client and perform a variety of functions through the instant messaging session.

14 Claims, 4 Drawing Sheets

OTHER PUBLICATIONS

Weis, et. al., "Towards a General Purpose User Interface for Service-oriented Context-aware Applications", Date: 2006, pp. 53-55, ACM Press, NY, USA, http://delivery.acm.org/10.1145/1150000/1145717/p53-weis.pdf?

Supplementary European Search Report for EP Application No. 07865400.1 dated Mar. 22, 2010.

Ronald van Loon, Joseph Lo: "An IRC Tutorial", Aug. 17, 2004, pp. 1-13, XP002572745. Retrieved from the Internet: URL:http://irchelp.org/irchelp/irctutorial.html. [retrieved on Mar. 11, 2010] paragraph [0001]p. 2.3.

* cited by examiner

REMOTE CONTROL USING INSTANT MESSAGING

BACKGROUND

Instant messaging is a widely used service of which many different flavors exist. In general, instant messaging is a mechanism by which a user may send live or nearly instant messages to another user. In its simplest form, instant messages are text messages. Some systems enable live audio or video conferencing and can have file transfer, image viewing, and other features, including presence information, where the online status of a user may be communicated to another user.

Instant message services typically provide authentication through a user name and password. Once authenticated to the system, a user may interact with the instant messaging service through any terminal that has access to the internet. Some services enable a user to send and receive messages through a portable cellular phone, personal digital assistant, personal computer, or other network appliance.

SUMMARY

An instant messaging client may operate on a host device and enable various forms of control of the host device via instant messaging commands. The instant messaging client may connect to an instant messaging service using a user name and having a list of authorized users. The client may be able to sense that a user is on line and initiate a message session with the user. The user may also be able to initiate a session with the host device through the instant messaging client and perform a variety of functions through the instant messaging session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
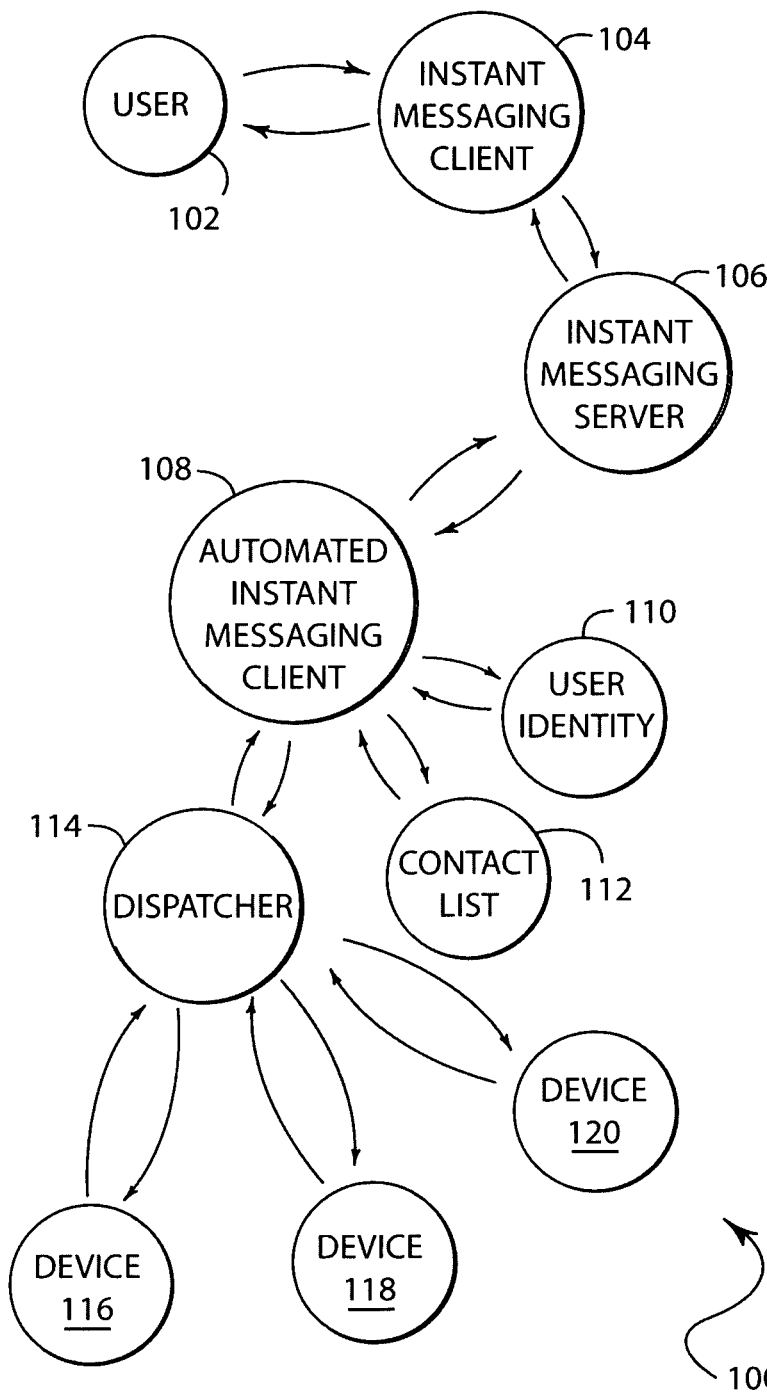
FIG. 1 is a diagram of an embodiment showing system for communicating with devices through instant messaging.

An instant messaging interface to a device or group of devices enables a user to interact with the devices using a familiar and secure mechanism. Authentication and security for communication may be provided through an instant messaging system and the interface may be provided through a firewall and enable access into a network for specific users that are previously identified on a contact list.

The instant messaging interface may provide a command structure for receiving and processing requests of the server hosting the interface, and may also be extensible for other devices. The interface may receive a request from a user, determine that the request is for another device, send the request to the device, receive a response, and transmit the response to the user.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for communicating with devices through instant messaging. A user 102 interacts with an instant messaging client 104 that communicates with an instant messaging server 106. The server 106 interacts with an automated instant messaging client 108 that has a user identity 110 and a contacts list 112. The automated instant messaging client 108 may communicate with a dispatcher 114 that communicates with various devices 116, 118, and 120.

Embodiment 100 is an example of a system that can be used to interact with various devices using instant messaging. An automated instant messaging client 108 may establish a presence in an instant messaging environment by logging on with an established user identity. A user 102, using the instant messaging system, may initiate an instant messaging or chat session with the automated client 108. The user 102 may interact with the automated client 108 by issuing requests and receiving responses. In some embodiments, the user 102 may, for example, request a menu of available commands as a starting point for an interactive conversation with the automated client 108.

A server that hosts the automated instant messaging client 108 may behind a firewall that may prevent unauthorized intrusion into a local area network. But allow some communications, such as email and instant messaging to get through. Thus, a user outside the firewall may connect into the local area network through the instant messaging path to perform various operations. The instant messaging system may provide authentication and security for any operations using existing infrastructure.

A user may perform various operations on the automated client 108 such as searching for and downloading files, requesting and receiving status information, performing various administrative functions such as rebooting, changing parameters, and other actions. A user may also control and receive data from various devices attached to the automated client 108.

For example, a thermostat device attached to the client 108 may be queried for the current temperature or the set point may be changed. In another example, a network enabled digital video recorder may be sent a request to display the showings of an upcoming television show, then one of the showings may be selected for recording. A digital video recorder may be requested to display a prerecorded or live television show through a video-capable instant messaging interface.

In yet another example, a network-enabled telephone answering device may be queried to determine if new messages have been left on the device and one or more of the messages may be requested to play the audio recording through an audio-capable instant messaging interface. In still another example, a network-enabled electronic bulletin board device may be capable of displaying stored messages on the instant messaging interface or may be able to receive a new message to display on the bulletin board.

The type and number of devices 116, 118, and 120 that may connect through the automated client 108 are unlimited. In many instances, the automated client 108 may provide a software interface to a device. The software interface may enable a device to add commands and routing information to the automated client 108 and dispatcher 114. When a user sends a command to the automated client 108, a dispatcher 114 may determine which device 116, 118, or 120 is the intended recipient of the command and direct the communication to the appropriate device. In some instances, the devices 116, 118, or 120 may be a hardware device with specific capabilities. In other instances, the devices 116, 118, or 120 may be a software application that adds specific capabilities to the automated client 108.

The automated client 108 may have a user identity 110 and a contact list 112. The user identity 110 may be the user identity used within the instant messaging environment to identify the client 108. In many cases, the user identity 110 may include a user name and password or other authenticating mechanism. When the client 108 is connected the instant messaging server 106, the client 108 appears on the system as if it were a human user with the user identity 110.

The contact list 112 may be a predetermined list of users with which the automated client 108 may communicate. The contact list 112 may contain the user identities of the user 102 and any other users permitted to communicate with the automated client 108. In some instances, the automated client 108 may ignore any communication with a user who is not in the contact list 112.

Some embodiments may have different permissions established for different users. A user may be given access to specific functions or to a limited number of devices or services. Other users may be given administrative access and may perform administrative functions while other users may be given data access and be able to gain access to sensitive data from one or more of the devices. Various configurations of user identities and permissions may be created.

The instant messaging system may be any type of system whereby messages are transferred in real time or near-real time. Examples include Microsoft Live Messenger, AOL Instant Messenger, Skype, ICQ, or any other similar system. In some instances, the instant messaging server 106 may relay instant messages from sender to receiver in a client-server architecture while in other instances, the instant messaging system may be a peer-to-peer architecture where messages are transported directly from the client 104 to the automated client 108.

In some uses, a device may be able to send information to the user 102 by sending a message to the automated client 108, which in turn may initiate a conversation with the user 102 through the instant messaging client 104. In this manner, a user may receive a short, instant communication when an event occurs. In some cases, the user may be given a choice of options to deal with the situation. For example, a network-enabled telephone voice recorder at home may send an instant message when a voicemail is left by a caller. The user may be given the option to receive the message via an audio path within the instant messaging system.

Figure 2:
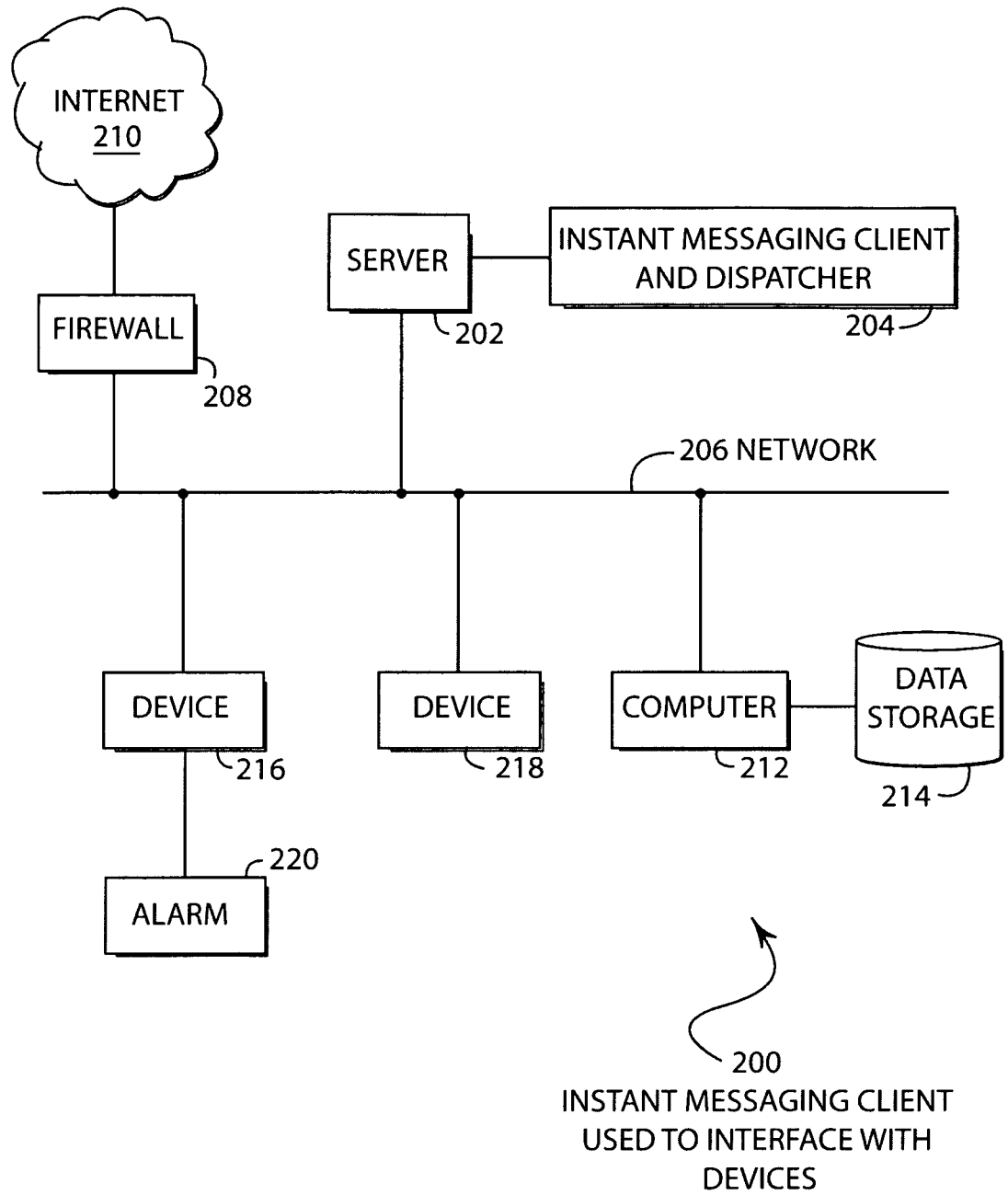
FIG. 2 is a diagram of an embodiment showing a instant messaging client used to interface with various devices.

FIG. 2 is a diagram of an embodiment 200 showing an instant messaging client used to interface with various devices. A server 202 has an instant messaging client and dispatcher 204 operable on the server 202. The server 202 is connected to a network 206, to which a firewall 208 provides a gateway to the internet 210 or other wide area network.

Attached to the network 206 are a computer 212 that has some data storage 214, plus devices 216 and 218. Device 216 has an alarm 220.

The instant messaging client 204 may permit a user connected to the internet 210 to communicate with the server 202. In some instances, the user may be able to search and retrieve files from the various data storage devices attached to the network 206. For example, a user may be able to query the data storage device 214 attached to the computer 212 and retrieve a file through an instant messaging system's file transfer mechanism. In another example, a user may be able to query the status of device 218 and adjust a parameter on device 218. Device 218 may be a network enabled temperature controller for a hot tub, and the user may query the current temperature and set a new temperature so that the hot tub may be warmed up when the user wishes to use the hot tub.

The device 216 may have an alarm 220 that is adapted to send a communication to the client 204 on a certain condition. In other embodiments, the client 204 may query the device 216 to see if the certain condition exists. In either event, the client 204 may establish a communication session with a user connected to the internet 210. The communication may contain options by which the user may perform some function relating to the device 216.

Figure 3:
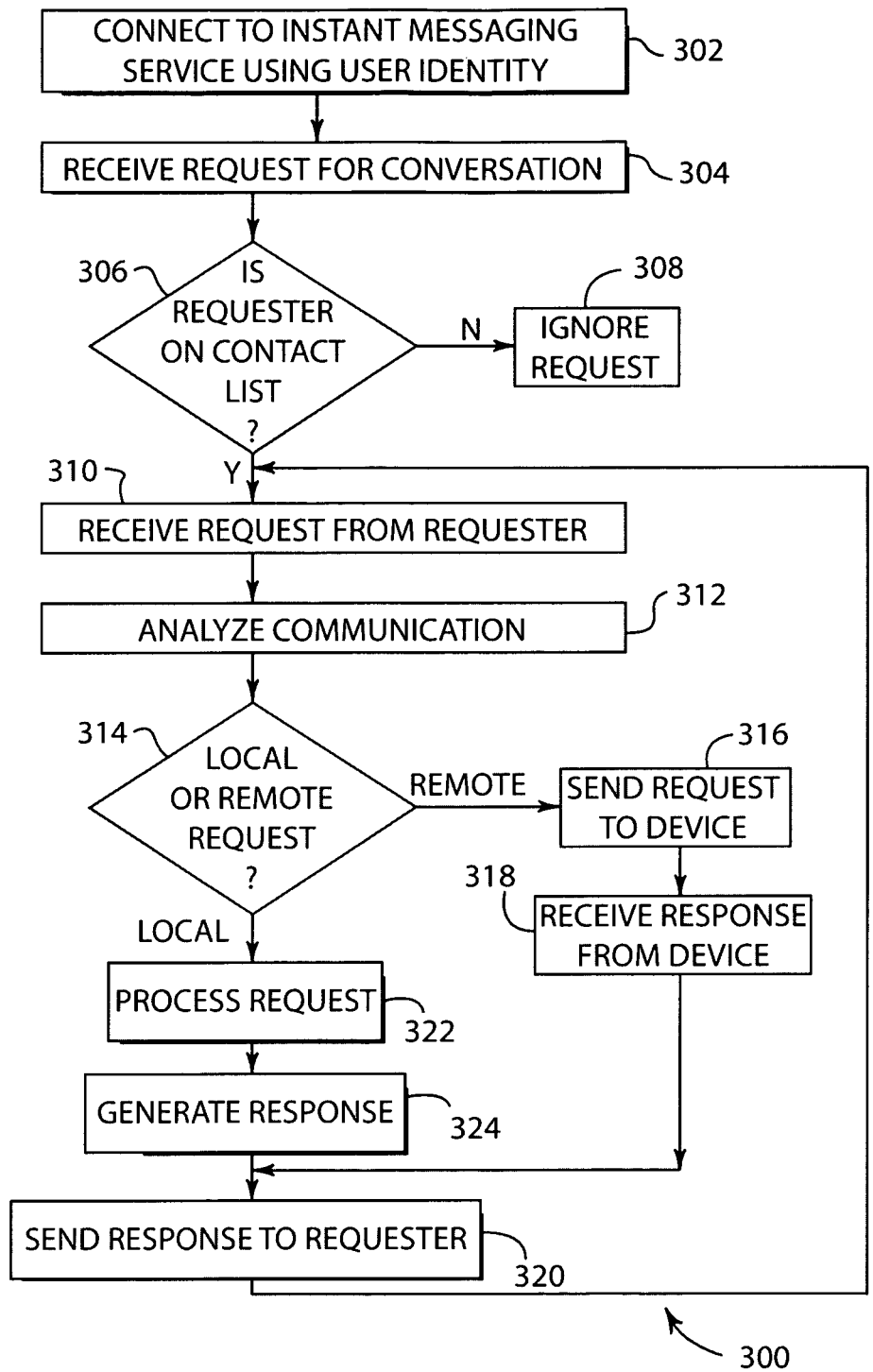
FIG. 3 is a flowchart illustration of an embodiment showing a method for responding to requests via instant messaging.

FIG. 3 is a flowchart illustration of an embodiment 300 showing a method of responding to requests via instant messaging. A connection is made to an instant messaging service using a user identity in block 302. A request for a conversation is received in block 304. If the requester is not on the contact list in block 306, the request is ignored in block 308.

If the requester is on the contact list in block 306, the request is received from the requester in block 310. The request is analyzed in block 312 to determine if the request is for the local server or a remote device. If the request is for a remote device in block 314, the request is formatted and sent to the device in block 316 and a response is received in block 318. The response is sent to the user in block 320. If the request is a local request in block 314, the request is processed in block 322 and a response is generated in block 324. The response is sent to the user in block 320 and the process continues at block 310.

The embodiment 300 is a simplified version of a sequence by which a user may establish communication with an automated instant messaging client and communicate with either the server that hosts the automated client or a remote device. The request is acted upon when the user requesting the communication is authenticated by already being on the contact list of the automated client. Based on this authentication, the user is permitted to send a request that may be local, or for the host of the automated client, or for a remote device.

A local request may be for functions or services that are operable on the host system for an automated instant messaging client. For example, a local request may be a request to transfer a file within the host system's file system. Another local request may inquire as to the operational status of the host system or to tell the host system to reboot itself.

A remote request may be for functions or services that are provided by an add-on software component or device with which the host may communicate. For example a device may include various devices attached to the same local network as the host device. In other examples, the devices may be connected to the host device through the internet, or the devices may be software applications running on the host system or some other system to which an automated client may communicate.

In some instances, an automated instant messaging client may compose, format, or arrange a communication to and from a remote device to meet the remote device's specific needs for data format. In such an instance, an incoming message may be translated or otherwise interpreted and then relayed to the device using a device-specific format. In such instances, the automated client may have a natural language interpreter that may receive and produce conversational language for the user interface.

Figure 4:
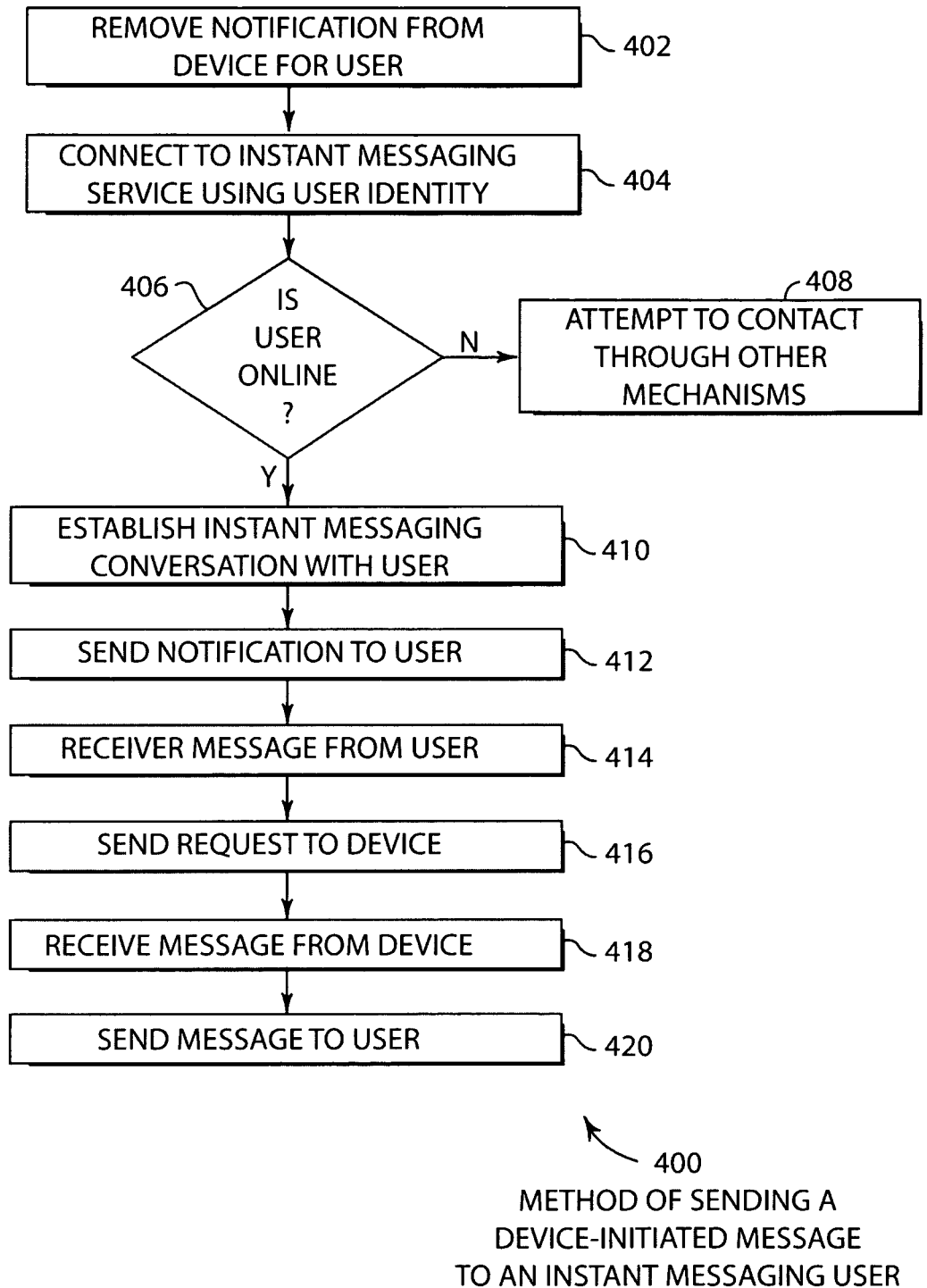
FIG. 4 is a flowchart illustration of an embodiment showing a method for sending a device-initiated message to an instant message user.

FIG. 4 is a flowchart illustration of an embodiment 400 showing a method of sending a device-initiated message to an instant messaging user. A notification is received in block 402 to transfer to a user. A connection is made to an instant messaging service in block 404 using a specific user identity. If the user not online in block 406, other mechanisms may be used to contact the user in block 408, such as email, text messaging, telephone, or other services.

If the user is on line in block 406, a conversation is established with the user in block 410 and a notification is sent to the user in block 412. If necessary, a reply may be received by the user in block 414 and the request is transferred to the initiating device in block 416. A response is received in block 418 and sent to the user in block 420. The conversation continues in block 414.

Embodiment 400 is an example of a method that an automated instant messaging client may employ to provide an instant message notification to a user. The notification from a device in block 402 may originate with the device, where the device detects that a condition exists and then contacts the automated client to transmit the message. In other embodiments, the client may periodically check the status of a device and compare the status against a set of rules to determine that a notification may be issued. Various configurations and architectures may be used to determine that a notification is to be sent.

Embodiments 300 and 400 are examples of various communication scenarios that may occur between a user and an automated internet messaging client. Conversations may be started by either party: the user or the automated client. The client may respond to requests that can be handled by the client itself or may serve as an intermediary between various devices and the internet messaging system. Where the client acts as an intermediary, the client may translate incoming messages from the user into messages that are readable by the device. Similarly, the client may receive a message from the device and translate the message into a natural language message suitable for a user.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. An instant messaging system for controlling one or more devices through instant messaging communication, the instant messaging system including an automated instant messaging client and a dispatcher,
    wherein the automated instant messaging client is configured to:
        connect with an instant messaging server;

establish a user identity with the instant messaging server, the user identity causing the automated instant messaging client to appear as human user to the instant messaging server;

receive an instant messaging command from another user through the instant messaging server, the instant messaging command specifying a function to be performed at a device selected from among the one or more devices;

control the other user's access to functions of the device based on permissions established for the other user;

forward the instant message command to the dispatcher when the permissions indicate that the other user has been given access to the specified function at the device;

receive a device related instant message from the dispatcher, the device related instant message including an informational response for the device; and forward the device related instant messages to the instant messaging server for delivery to the other user; and wherein the dispatcher is configured to:

receive the instant message command from the instant messaging client interface;

analyze the received instant message command to identity the device as a recipient device for the instant message command;

translate the instant message command to meet a specific data format for the device;

route the translated instant message command to the device;

receive an informational response from the device in the specific data format;

translate the information response into a device related instant message that includes the informational response; and send the device related instant message for deliver to the other user.

2. The instant messaging system of claim 1, wherein the automated instant messaging client is further configured to receive a request for a menu of available commands.

3. The instant messaging system of claim 1, wherein the dispatcher being configured to receive the instant message command comprises the dispatcher being configured to receive a file system command for downloading a file; and wherein the dispatcher being configured to generate the device related instant message that includes the information response comprises the dispatcher being configured to generate the device related instant message that includes the file.

4. The instant messaging system of claim 1, wherein the automated instant messaging client being configured to receive an instant message command comprises the automated instant messaging client being configured to receive an instant messaging command for one of: searching for a file and fetching a file.

5. The instant messaging system of claim 1, wherein the automated instant messaging client being configured to receive an instant message command comprises the automated instant messaging client being configured to receive an instant messaging command for rebooting the device.

6. The instant messaging system of claim 1, wherein the automated instant messaging client being configured to receive an instant message command comprises the automated messaging client interface being configured to receive an instant messaging command for one of: requesting a status of a device and sending data to a device.

7. The instant messaging system of claim 1 further comprising the automated instant messaging client being configured to provide a software interface to the device, the software interface enabling the device to add commands and routing information to the automated instant messaging client.

8. At an automated instant messaging client, a method comprising:

connecting with an instant messaging server;

establishing a user identity with the instant messaging server, the user identity causing the automated instant messaging client to appear as human user to the instant messaging server;

receiving an instant messaging command from another user through the instant messaging server, the instant messaging command specifying a function to be performed at a device selected from among the one or more devices;

controlling the other user's access to functions of the device based on permissions established for the other user;

translating the instant message command to meet a specific data format for the device;

routing the translated instant message command to the device when the permissions indicate that the other user has been given access to the specified function at the device, the routing in accordance with routing information added to the automated instant messaging client by the device through a software interface;

receiving an informational response from the device in the specific data format;

translating the information response into a device related instant message that includes the informational response; and sending the device related instant message to the instant messaging server for delivery to the other user.

9. The method of claim 8 wherein receiving an instant messaging command from another user through the instant messaging server comprises receiving an instant message command for rebooting the device.

10. The method of claim 8 wherein receiving an instant messaging command from another user through the instant messaging server comprises receiving an instant message command for one of: searching for a file and fetching a file.

11. The method of claim 8 wherein receiving an instant messaging command from another user through the instant messaging server comprises receiving an instant message command for one of: requesting a status of a device and sending data to a device.

12. The method of claim 8 wherein receiving an instant messaging command from another user through the instant messaging server comprises receiving an instant message command for downloading a file; and wherein generating a device related instant message that includes the informational response comprises generating a device related instant message that includes the file.

13. A computer program product for use at an automated instant messaging client, the computer product comprising one or more computer storage devices having stored thereon computer-executable instructions that, when executed, cause the automated instant messaging client to:

connect with an instant messaging server;

establish a user identity with the instant messaging server, the user identity causing the automated instant messaging client to appear as human user to the instant messaging server;

receive an instant messaging command from another user through the instant messaging server, the instant messaging command specifying a function to be performed at a device selected from among the one or more devices;

control the other user's access to functions of the device based on permissions established for the other user;

translate the instant message command to meet a specific data format for the device;

route the translated instant message command to the device when the permissions indicate that the other user has been given access to the specified function at the device, the routing in accordance with routing information added to the automated instant messaging client by the device through a software interface;

receive an informational response from the device;

translate the information response into a device related instant message that includes the informational response; and send the device related instant message to the instant messaging server for delivery to the other user.

14. The computer program product of claim 13, wherein computer-executable instructions that, when executed, cause the automated instant messaging client to receive an instant messaging command from another user through the instant messaging server comprise to receive an instant messaging command for one of: rebooting the device, downloading a file from the device, searching for a file on the device, changing parameters of the device, requesting status information from the device.

* * * * *